(12) United States Patent
Manning et al.

(10) Patent No.: US 11,959,567 B2
(45) Date of Patent: Apr. 16, 2024

(54) METHODS FOR DECREASING STRESS IN FLANGE BOLTING

(71) Applicant: Dril-Quip, Inc., Houston, TX (US)

(72) Inventors: Mark A. Manning, Houston, TX (US); Justin Rye, Houston, TX (US); Flavio Santos, Houston, TX (US)

(73) Assignee: Dril-Quip, Inc., Houston, TX (US)

( * ) Notice: Subject to any disclaimer, the term of this patent is extended or adjusted under 35 U.S.C. 154(b) by 320 days.

(21) Appl. No.: 17/267,250

(22) PCT Filed: Aug. 30, 2019

(86) PCT No.: PCT/US2019/048983
§ 371 (c)(1),
(2) Date: Feb. 9, 2021

(87) PCT Pub. No.: WO2020/047366
PCT Pub. Date: Mar. 5, 2020

(65) Prior Publication Data
US 2021/0164595 A1 Jun. 3, 2021

Related U.S. Application Data (60) Provisional application No. 62/725,009, filed on Aug. 30, 2018.

(51) Int. Cl.
*F16L 23/032* (2006.01)
*E21B 17/046* (2006.01)
(Continued)

(52) U.S. Cl.
CPC .......... *F16L 23/032* (2013.01); *E21B 17/046* (2013.01); *F16L 23/036* (2013.01); *F16L 23/02* (2013.01)

(58) Field of Classification Search
CPC ... F16L 23/032; F16L 23/036; F16L 23/0283; F16L 23/024; F16L 23/02; F16L 23/162; F16L 23/20
(Continued)

(56) References Cited

U.S. PATENT DOCUMENTS 2,695,184 A * 11/1954 Hobbs ................. F16L 23/0283
3,245,708 A * 4/1966 Kooistra ................. F16L 23/02
(Continued)

FOREIGN PATENT DOCUMENTS

CN         104595603 A  *  5/2015   ............ F16L 23/032
WO      2008/141647 A1     11/2008
WO    WO-2017126973 A1  *  7/2017   .............. F16L 23/20

OTHER PUBLICATIONS

Dimensional Consulting, Bolted Joints, Dec. 29, 2017, pp. 1-11 (Year: 2017).*
(Continued)

*Primary Examiner* — William S. Choi
(74) *Attorney, Agent, or Firm* — Baker Botts L.L.P.

(57) ABSTRACT

Systems and methods for decreasing bending stress in flange bolting for a connection between a flange and an adjacent piece of equipment is provided. The flange connection includes a single flange with multiple bolts extending therethrough. The bolts are threaded into the adjacent piece of equipment at one end, and a nut is disposed at an opposite end of each bolt to provide a means for tightening and/or securing the flange connection. The equipment to which the flange is attached may include subsea well equipment with relatively large outer diameters. The disclosed flange connection utilizes an initial region of a counterbored (or unthreaded) hole in the mating equipment piece just prior to the start of the thread formed through the equipment.
(Continued)

Additionally, a compound hub flange connection is disclosed to further reduce the bending stress on the bolts.

13 Claims, 11 Drawing Sheets

(51) Int. Cl.
    *F16L 23/02*     (2006.01)
    *F16L 23/036*     (2006.01)

(58) Field of Classification Search
    USPC .................................................. 285/405, 412
    See application file for complete search history.

(56) References Cited

U.S. PATENT DOCUMENTS

| | | | | |
|---|---|---|---|---|
| 3,490,796 | A * | 1/1970 | Smith, Jr. | F16L 23/036 |
| | | | | 285/412 |
| 3,749,426 | A * | 7/1973 | Tillman, III | F16L 23/20 |
| 5,690,368 | A | 11/1997 | Johnson | |
| 6,394,507 | B1 * | 5/2002 | Baker | F16L 23/0283 |
| 8,007,011 | B2 | 8/2011 | Muzzo et al. | |
| 10,190,641 | B2 * | 1/2019 | Struck | |
| 2002/0140184 | A1 * | 10/2002 | Janoff | F16J 15/0887 |
| 2002/0197129 | A1 | 12/2002 | Kelch | |
| 2003/0155721 | A1 * | 8/2003 | Zheng | F16L 23/20 |
| 2006/0017287 | A1 * | 1/2006 | Milberger | F16L 25/026 |
| | | | | 285/412 |
| 2012/0131981 | A1 * | 5/2012 | Mach | F16L 23/024 |
| 2014/0333067 | A1 * | 11/2014 | Okabe | F16L 23/036 |
| | | | | 285/405 |
| 2015/0176358 | A1 * | 6/2015 | Williams | |
| 2016/0319854 | A1 | 11/2016 | Mongeau et al. | |

OTHER PUBLICATIONS

Fastener Mart, Hex Bolts, Dec. 30, 2017, pp. 1-5 (Year: 2017).*
CN 104595603 A—Machine Translation—English (Year: 2015).*
International Search Report and Written Opinion issued in related PCT Application No. PCT/US2019/048983 dated Dec. 13, 2019, 14 pages.

* cited by examiner

METHODS FOR DECREASING STRESS IN FLANGE BOLTING

CROSS-REFERENCE TO RELATED APPLICATION

This application is the National Stage of International Application No. PCT/US2019/048983 filed Aug. 30, 2019, which claims the benefit of U.S. Provisional Patent Application No. 62/725,009, filed Aug. 30, 2018, entitled "METHODS FOR DECREASING STRESS IN FLANGE BOLTING", the entire disclosure of which is incorporated herein by reference.

TECHNICAL FIELD

The present disclosure relates generally to flanges and, more particularly, to systems and methods for decreasing stress in flange bolting.

BACKGROUND

Flanges are used in a wide variety of contexts, including, the field of subsea equipment. Traditionally, subsea flanges have been almost exclusively based on standardized geometry, defined by the American Petroleum Institute (API), which consists of a single huh face consisting of a small groove cut out for a metal sealing gasket. In recent years, the oil and gas industry has begun to push the limits of technology by drilling and producing subsea wells in high-pressure/high-temperature (HPHT) environments. Currently, API has only a limited selection of smaller-diameter flanges that are rated for these high-pressure and high-temperature environments. In development, of a new large diameter flange for subsea HPHT use, it has been discovered that the large thermal gradients subjected to subsea HPHT flanges produce new challenges that cannot be easily met by the traditional single hub face API style flanges. The contemporary approach adopted by HPHT equipment manufacturers has been to increase the thickness of the flange. Detailed analysis has shown that this approach alone may still not be sufficient for handling all HPHT loading unless the thickness is substantially increased over traditional API flange thicknesses. It is now recognized that flanges utilizing a compound hub face inside the bolt circle diameter provides increased rated capacities without the need of increasing the thickness of the flange.

In some applications, a flange is made up directly to an adjacent flange, with multiple bolts extending through the two flanges, and each having a pair of nuts (one on each side of the flange connection) to secure the flanges together. In other applications, particularly in certain subsea equipment configurations, a flange is made up directly to another piece of equipment using a stud configuration. That is, a bolt extends through the flange and into the adjacent part, and only one nut on the flange side is used to tighten the connection. In such instances, the bolts are screwed directly into tapped holes on the adjacent part, resulting in a shorter clamping length for the bolt.

Analysis has shown that increasing clamping length of a bolt through a flange connection results in decreased bending stresses in the bolts. It is desirable to minimize these bending stresses. To minimize these bending stresses, a commonly practiced approach has been to increase the thickness of the flange. Unfortunately, increasing the flange thickness results in additional stack height and weight for the connection. This increased stack height and weight is undesirable, particularly in subsea equipment configurations due to the already very large sizes of the flanges and equipment being used. It is now recognized that a more space-efficient and weight-efficient method is needed to reduce the bending stresses in flange bolting in assemblies where the flange is connected to another piece of equipment via stud connections.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Illustrative embodiments of the present disclosure are described in detail herein. In the interest of clarity, not all features of an actual implementation are described in this specification. It will of course be appreciated that in the development of any such actual embodiment, numerous implementation specific decisions must be made to achieve developers' specific goals, such as compliance with system related and business related constraints, which will vary from one implementation to another. Moreover, it will be appreciated that such a development effort might be complex and time consuming, but would nevertheless be a routine undertaking for those of ordinary skill in the art having the benefit of the present disclosure. Furthermore, in no way should the following examples be read to limit, or define, the scope of the disclosure.

Certain embodiments according to the present disclosure are directed to systems and methods for decreasing bending stress in flange bolting for a flange connection between a flange and an adjacent piece of equipment. The flange connection includes a single flange with multiple bolts extending therethrough. The bolts are threaded into the adjacent piece of equipment at one end, and a nut is disposed at an opposite end of each bolt to provide a means for tightening and/or securing the flange connection. The equipment to which the flange is attached may include subsea well equipment with relatively large outer diameters.

The disclosed flange connection utilizes an initial region of a counterbored (or untapped) hole in the mating equipment piece just prior to the start of the thread formed through the equipment. That is, instead of the bolt being connected via threads to the equipment piece for the entire length that the bolt extends into the equipment, a first longitudinal segment of the bolt extending through the equipment will not be in threaded engagement with the equipment. This provides an increased clamp length for the bolt without increasing a thickness of the flange, thereby reducing resultant maximum bending stresses in the bolts. This is accomplished by distributing the stresses over the longer clamping length.

Detailed finite element analysis (FEA) of the disclosed flange connection shows that tier large diameter subsea sized flanges, a notable reduction of bending stress on bolts can be achieved using an unthreaded region formed through the adjacent piece of equipment. A ratio of the bending stress reduction on the bolt offered from increased flange thickness compared to that offered from a length of unthreaded region is approximately 1.5. As such, the flange thickness can be reduced by 1 inch for every 1.5 inches of untapped hole through the equipment piece to provide the same bending stress protection.

For purposes of this disclosure, the terms "bolts", "studs", and "screws" as used herein are intended to refer to a general class of generally cylindrical fasteners consisting of threads on some portion of the round face of the generally cylindrical body. As would be understood by one of ordinary skill in the art, in many situations, the fasteners within this class may be used interchangeably, with or without modifications to the mating components, and yield similar performance. Thus, it will be appreciated that the terms "bolts", "studs", and "screws", may be used interchangeably herein without limiting the scope of the present disclosure. Additionally, other types of fasteners not listed may also be used to gain similar benefits in accordance with aspects of the present disclosure.

Figure 1:
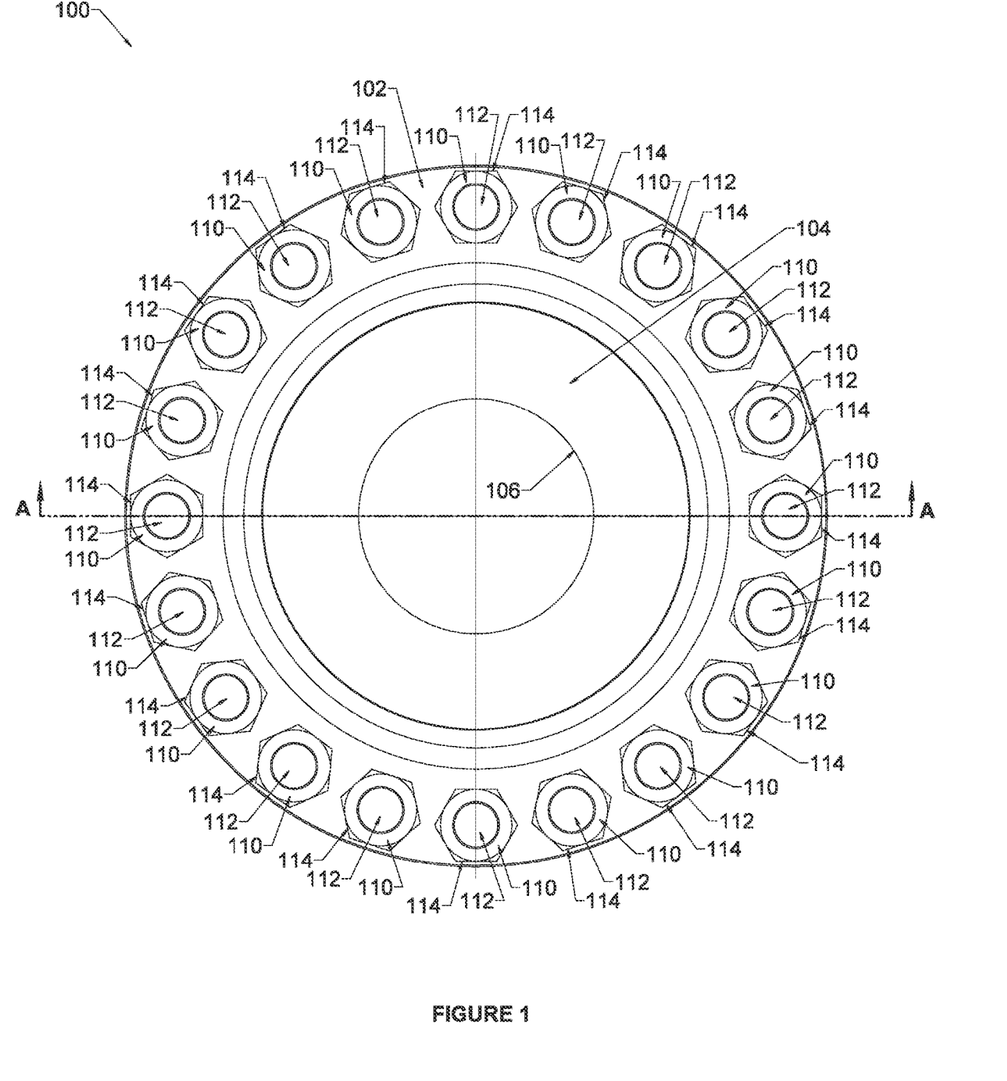
FIG. 1 is a top view of a flange connection, in accordance with an embodiment of the present disclosure.

Turning now to the drawings, FIG. 1 is a top view of a flange connection 100 in accordance with an embodiment of the present disclosure. The flange connection 100 may form a piece of subsea well equipment. In some embodiments, the flange connection 100 may be utilized to connect a first tubular to a second tubular for use in a subsea environment. The flange connection 100 generally includes a flange 102 connected to another piece of equipment (not visible).

The flange 102 may form part of an upper tubular 104 having a bore 106 formed therethrough. The piece of equipment connected to the flange 102 may include a lower tubular having a bore formed therethrough: The upper tubular 104 may be connected to the lower tubular (not shown) via the flange connection 100. In such embodiments the flange connection 100 may include studs 110 that pass through the flange 102 (e.g., upper tubular 104) and the piece of equipment (e.g., lower tubular) and are threadedly connected to the piece of equipment. Although the flange connection 100 is illustrated herein as providing a connection of two tubular components, other embodiments of the flange connection 100 may include the flange 102 being used to connect other subsea components, such as connecting a block to a subsea tree or an actuator assembly to a blowout preventer.

The flange 102 is connected to the piece of equipment via a plurality of studs 110 to form the flange connection 100. Each stud 110 includes a bolt 112 having a nut 114 disposed thereon. In general, the nut 114 is threadedly coupled to the bolt 112, and the bolt 112 extends in an axial direction through the flange 102 and the adjacent piece of equipment.

Figure 2A:
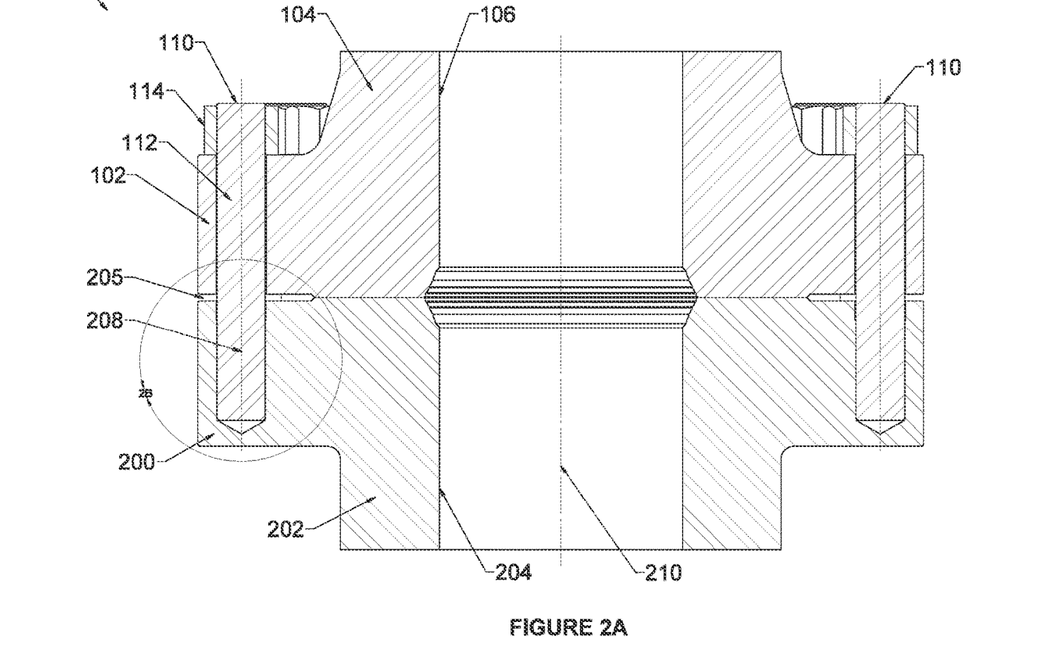
FIG. 2A is a cross-sectional view of the flange connection of FIG. 1 taken along lines A-A, in accordance with an embodiment of the present disclosure.
Figure 2B:
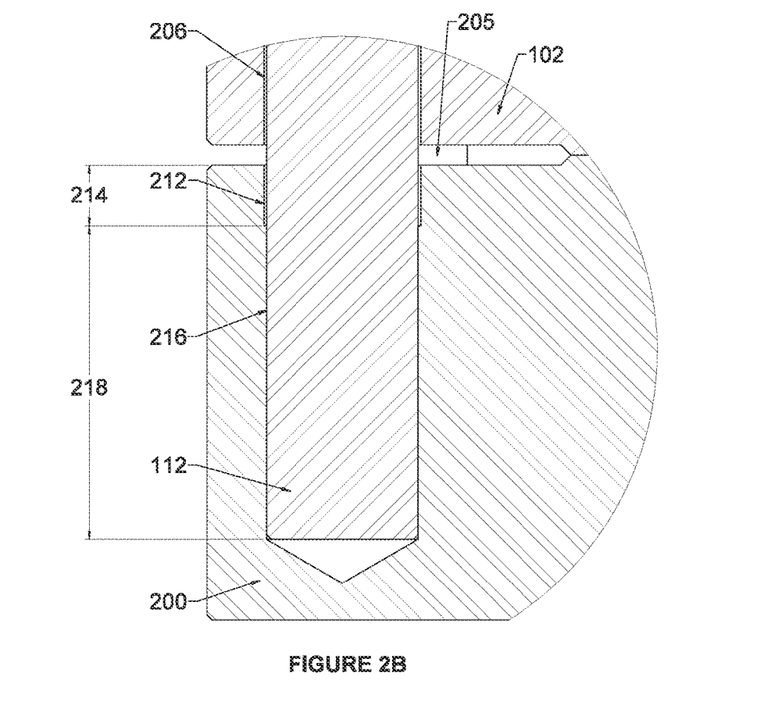
FIG. 2B is a detailed view of the flange connection of FIG. 2A taken within the circle 2B, in accordance with an embodiment of the present disclosure.

FIGS. 2A and 2B provide cross-sectional views of an embodiment of the flange connection 100, taken along lines A-A of FIG. 1 and within circle 2B of FIG. 2A, respectively, FIG. 2A shows the flange connection 100 being used to secure the flange 102. (which is part of an upper tubular 104) to an adjacent piece of equipment 200 (which in 2A and 2B is a lower tubular 202). The lower tubular 202 has a bare 204 formed therethrough, similar to the bore 106 of the upper tubular 104. As shown, multiple studs 110 extend through the flange 102 and the adjacent equipment 200 to secure the flange connection 100. Each stud 110 may include a bolt 112 extending from a location above an upper surface of the flange 102 to a position within the equipment component 200. The bolts 112, as shown, each terminate within the equipment component 200. The bolts 112 are each disposed through the flange 102 and then attached to the equipment component 200 via a threaded connection, which is described in greater detail below. The nuts 114 are threaded onto the top of the corresponding bolts 112 to complete the flange connection 100. As illustrated, the flange 102 and equipment component 200 may be shaped such that the bolts 112 pass through a small gap 205 between a downward facing surface of the flange 102 and an upward facing surface of the equipment 200.

As shown in FIGS. 2A and 2B, the flange 102 may have multiple untapped or counterbored apertures 206 formed therethrough, one for receiving each of the bolts 112. The term "untapped" or "counterbored" refers to the apertures 206 having relatively smooth (i.e., non-threaded) interior walls that are slightly larger than an outer diameter of the bolt 112 passing therethrough. The untapped apertures 206 basically function as passages through which the bolts 112 extend axially (along axes 208) through the flange 102. The axis 208 of each aperture and/or bolt 112 through the flange connection 100 is parallel to and radially offset from a longitudinal axis 210 of the flange 102 and the corresponding equipment 200.

The piece of equipment 200 to which the flange 102 is attached may have multiple apertures formed therethrough as well. These apertures may each have an untapped or counterbored section 212 extending a first axial distance 214 along axis 208, and a tapped or threaded section 216 extending a second axial distance 218 along axis 208. That is, a first portion (212) of each aperture through the piece of equipment 200 may have relatively smooth (i.e., non-threaded) interior walls that are slightly larger than an outer diameter of the bolt 112 to allow the bolt 112 to pass therethrough, while a second portion (216) of each aperture through the equipment 200 has threads formed in the interior walls to interface directly with threads on an external diameter of the bolts 112.

The bolts 112 pass through the untapped apertures 206 of the flange 102 and the corresponding untapped portions 212 of the apertures through the equipment 200, and then a lower portion of the length of each bolt 112 is threaded into engagement with the equipment 200 via the threaded sections 216 of the apertures through the equipment 200. The nuts 114 are then threaded onto the upwardly extending portions of the bolts 112 to securely fasten the flange connection 100. The additional untapped or counterbored sections 212 of the apertures formed through the equipment 200 provide an increased clamping length for the bolts 11:2 as compared to a similar system where the entire length of the apertures through the equipment are threaded. This increased clamping length reduces the bending stresses experienced by the bolts 112 during operation of the equipment without having to increase an, axial thickness of the flange 102.

FIGS. 2A and 2B illustrate an embodiment of the flange connection 100 where the length 214 of the untapped portions 212 of the apertures through the equipment 200 is approximately 1.5 inches in length. This provides roughly the same decrease in bending stresses on the bolts as a 1 inch increase in axial thickness of the flange. Thus, the disclosed flange connection 100 facilitates reduced bending stresses on the bolts 112 while also keeping the overall dimensions and weight of the flange connection 100 to a minimum, as no increase in flange thickness is required.

Figure 3A:
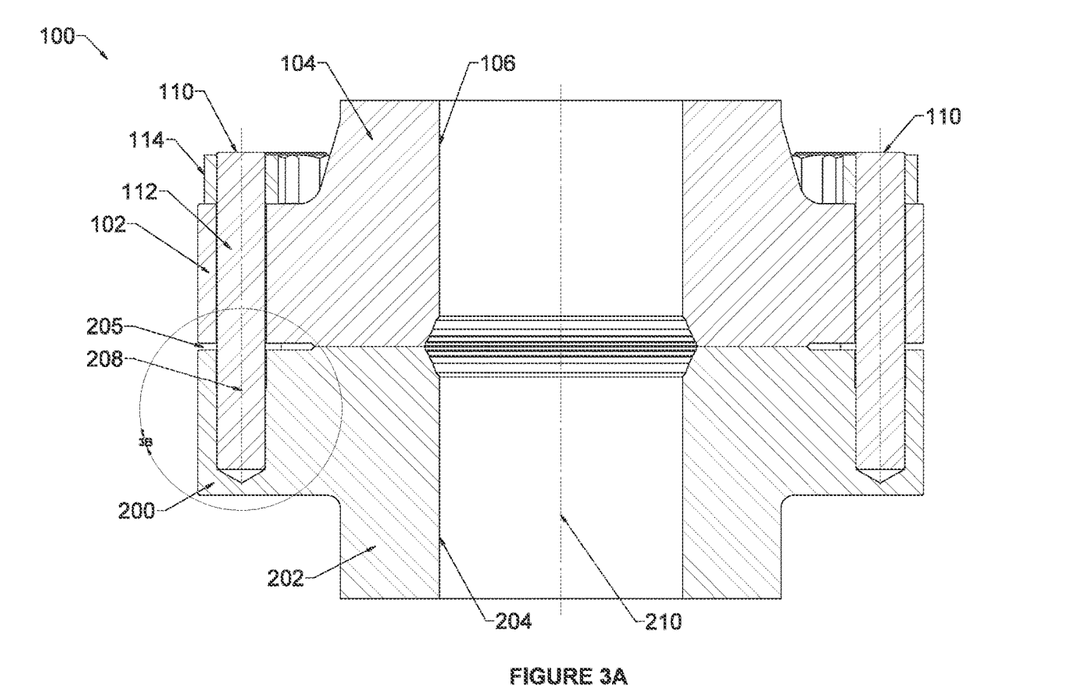
FIG. 3A is a cross-sectional view of the flange connection of FIG. 1 taken along lines A-A, in accordance with an embodiment of the present disclosure.
Figure 3B:
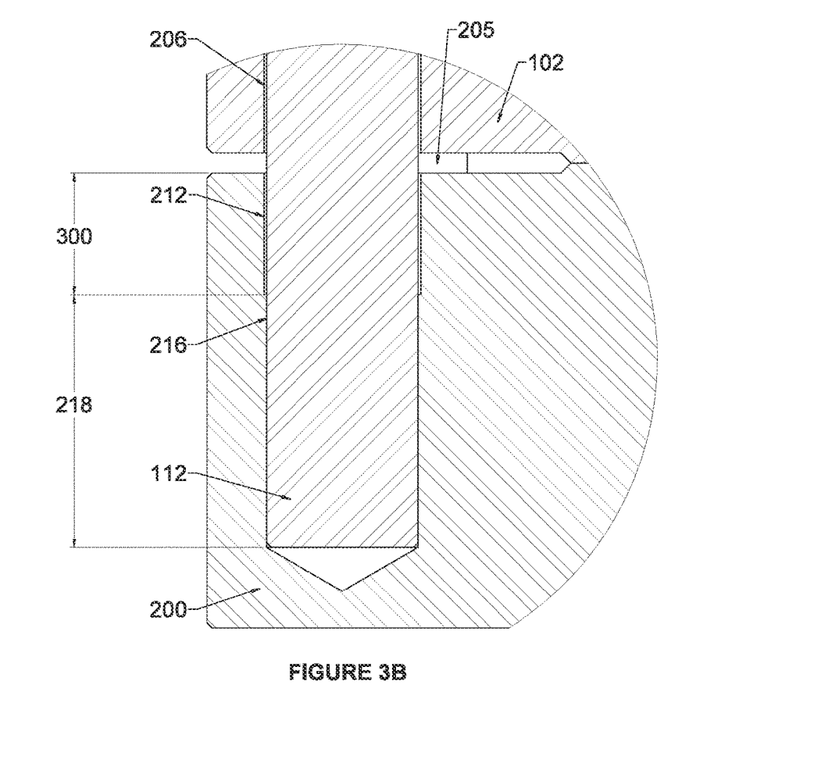
FIG. 3B is a detailed view of the flange connection of FIG. 3A taken within the circle F, in accordance with an embodiment of the present disclosure.

FIGS. 3A and 3B illustrate a similar embodiment of the flange connection 100 described above, but where a length. 300 of the untapped portions 212 of the apertures through the equipment 200 is approximately 3 inches in length. This provides roughly the same decrease in bending stresses on the bolts as a 2 inch increase in axial thickness of the flange. Thus, the disclosed flange connection 100 facilitates reduced bending stresses on the bolts 112 while also keeping the overall dimensions and weight of the flange connection 100 to a minimum, as no increase in flange thickness is required.

Figure 4:
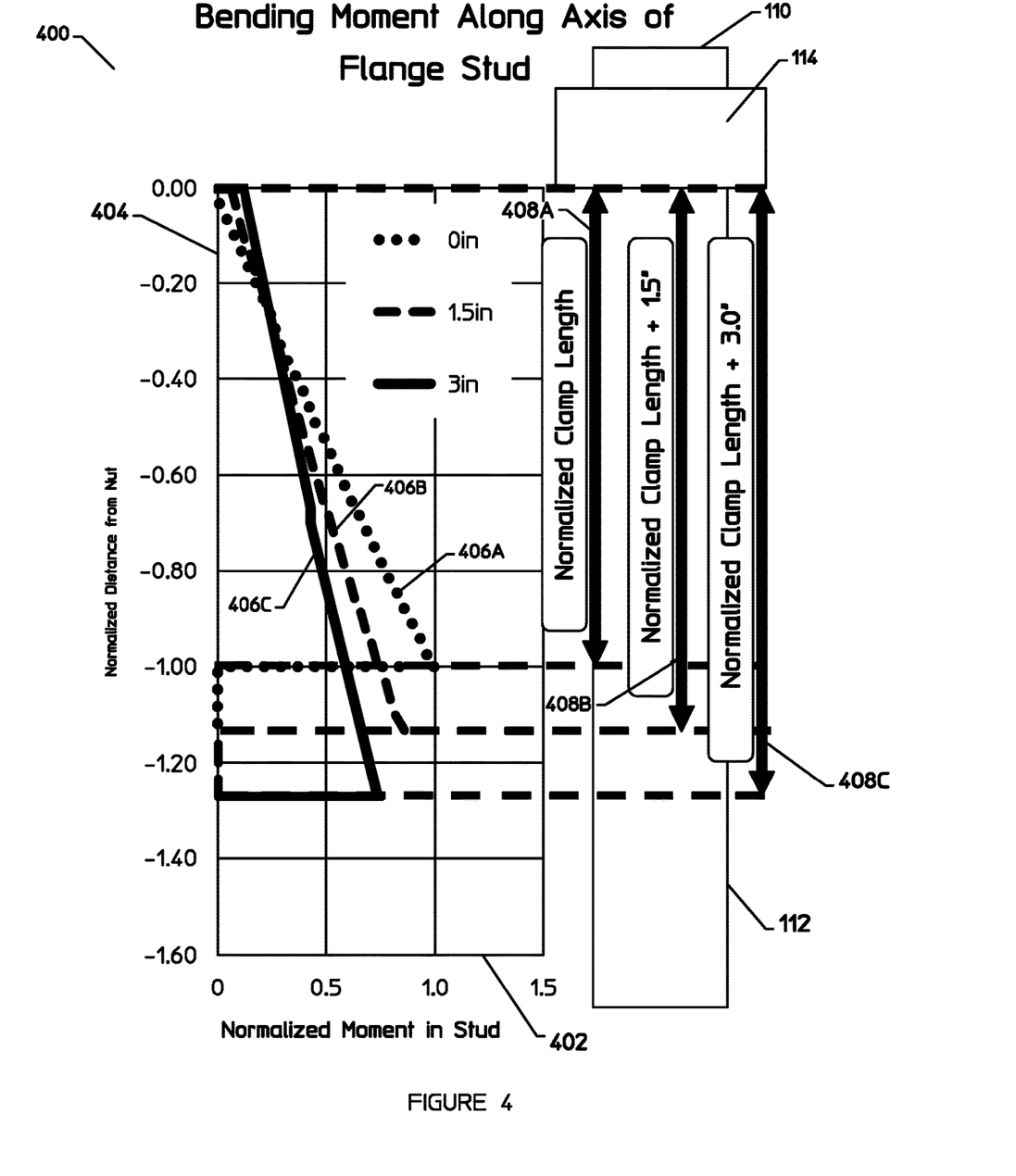
FIG. 4 is a plot illustrating, bending stresses on a flange stud used in three different flange connections, in accordance with an embodiment of the present disclosure.

FIG. 4 is a plot 400 comparing bending stresses in flange studs 110 for flange connections having different relative constructions. The plot 400 shows a normalized moment 402 (from bending stress) experienced within the bolt 112 of a stud 110, taken with respect to a distance 404 along the bolt 112 measured from the nut 114. Three trend lines 406A, 406B, and 406C are shown, each corresponding to a different clamp length 408A, 408B, and 408C, respectively. "Clamp length" refers to a distance along the bolt axis (208 of FIGS. 2A-3B) from the nut 114 to where the threaded portion (216 of FIGS. 2A-3B) starts within the equipment (200 of FIGS. 2A-3B). A flange connection with a longer untapped section of the aperture through the piece of equipment will have a longer clamp length 408.

In FIG. 4, the trend line 406A corresponds to the bending moment on a bolt connecting a flange to a piece of equipment that does not have any untapped section (216) of the apertures formed therethrough. This represents a "normalized" bending moment for a typical flange connection. The clamp length 408A is a "normalized" clamp length. The trend line 406B corresponds to the bending moment on a bolt connecting a flange to a piece of equipment that has a 1.5 inches long untapped section (216) of the apertures formed therethrough. This specifically corresponds to the embodiment of the flange connection 100 shown in FIGS. 2A and 2B. The clamp length 408B is equal to the "normalized" clamp length+1.5 inches. The trend line 406C corresponds to the bending moment on a bolt connecting a flange to a piece of equipment that has a 3 inches long untapped section (216) of the apertures formed therethrough. This specifically corresponds to the embodiment of the flange connection 100 shown in FIGS. 3A and 3B. The clamp length 408C is equal to the "normalized" clamp length+3 inches.

As can be observed from the plot 400, the highest bending moments on the two trend lines 406B and 406C are both less than the highest bending moment on the trend line 406A. According to the analysis results of plot 400, the presently disclosed flange connection 100 (which has at least some untapped or counterbored portion of the apertures formed through the piece of equipment) decreases the bending stresses on the bolts 112 compared to flange connections that do not have such untapped/counterbored portions.

Figure 5A:
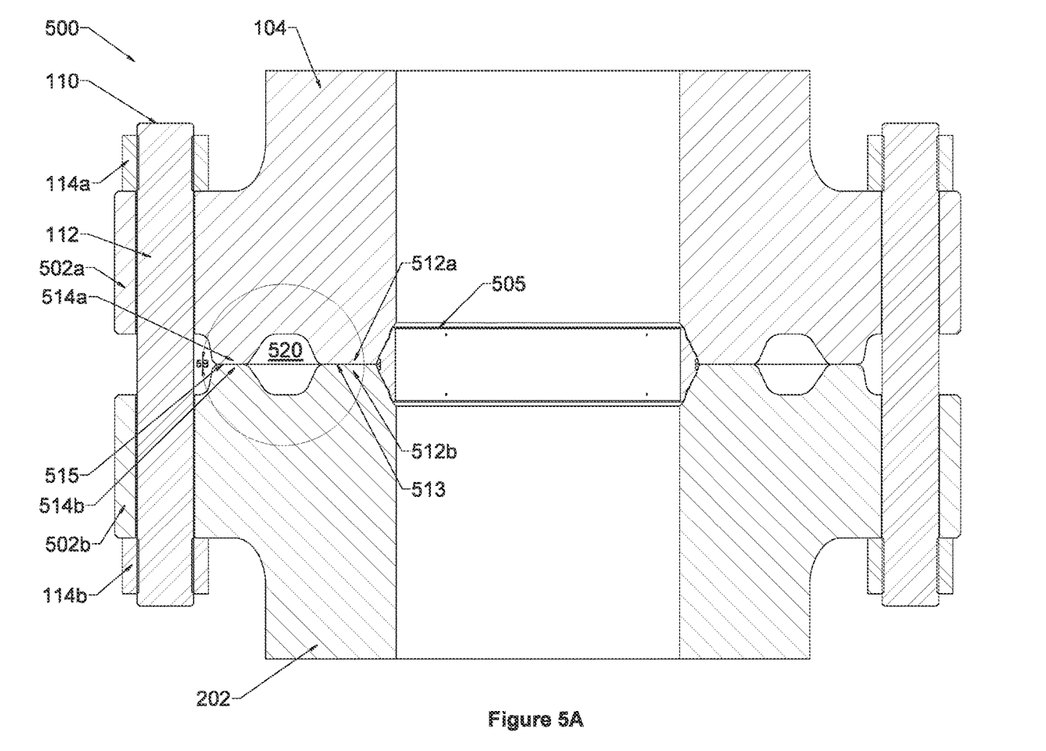
FIG. 5A is a cross-sectional view of a compound hub flange connection, in accordance with an embodiment of the present disclosure.
Figure 5B:
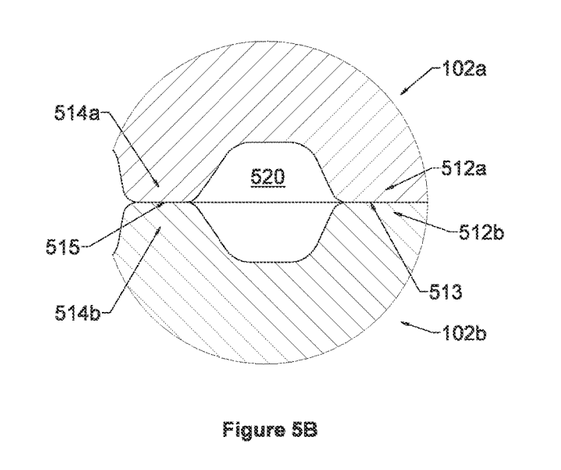
FIG. 5B is a detailed view of the compound hub flange connection of FIG. 5A taken within the circle C, in accordance with an embodiment of the present disclosure.

FIGS. 5A and 5B provide cross-sectional views of a compound hub flange connection 500 in accordance with another aspect of the present invention. A compound bob flange connection 500 may reduce the bending and tensile stresses on bolts 112 without having to increase the axial thickness of a compound flange 502 or the size of the bolts 112. Compound hub flange connection 500 may be used to connect a first tubular to a second tubular, tor example, the upper tubular 104 and the lower tubular 202 of FIG. 2A.

Ha 5A shows the compound hub flange connection 500 being used to secure an upper compound hub flange 502a (which is part of upper tubular 104) to a lower compound hob flange 502b (which is part of lower tubular 202). The compound hub flange connection 500 can secure compound flanges 502a and 502b using one or more studs lit) extending through the compound flanges 502a and 502b. Each stud 110 may comprise a bolt 112 extending from an upper surface of an upper flange 102a to a lower surface of a lower flange 102b. Nuts 114a and 114b may be threaded on both ends of bolt. 112 to secure the flanges 502a and 502b in compression. As shown, compound flanges 502a and 502b may be shaped such that bolt 112 passes through a gap between a downward facing surface of upper compound flange 502a and an upward facing surface of lower compound flange 502b.

Figure 10:
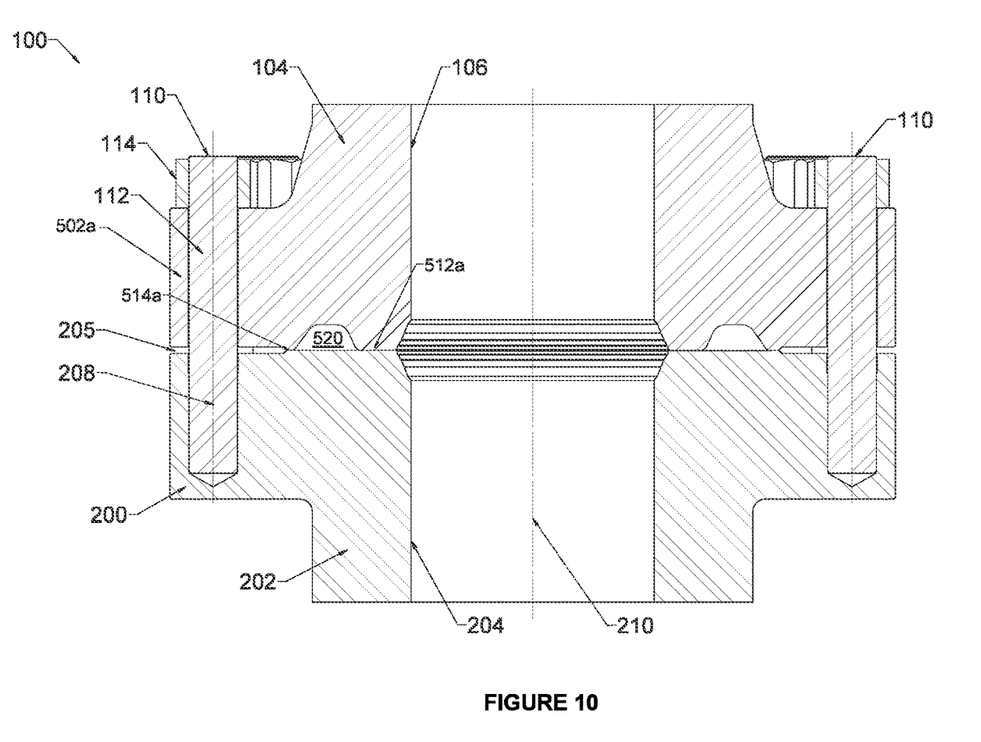
FIG. 10 is a cross-sectional view of flange connection having a compound flange connected to a piece of equipment, in accordance with an embodiment of the present disclosure.

Compound hub flange connection 500 depicted in FIGS. 5A and 5B may be used in combination with the flange 102 and lower equipment 200 described in FIGS. 2A and 2B, and similarly in FIGS. 3A and 3B. Such a combination of these components is illustrated in FIG. 10. The system of FIG. 10 includes, for example, the upper compound hub flange 502a fraying an aperture extending therethrough, an inner hub face 512a, an outer hub face 514a, and a groove 520 that is formed between the inner hub face 512a and the outer hub face 514a. The system of FIG. 10 also includes the piece of equipment 200 adjacent the compound flange 502a and having an aperture extending therethrough and aligned with the aperture of the compound flange 502a. The bolt 112 extends through the compound flange 502a and is threaded into the piece of equipment 200 to connect the compound flange 502a to the piece of equipment 200.

The compound hub flange connection 500 of FIG. 10 may benefit from the untapped or counterbored section 212 and the tripped or threaded section 216 of the aperture 206, as described above, to reduce the bending stress on bolts 112. Thus, a compound hub flange connection 500 as described in more detail below (and in combination with the untapped or counterbored section 212 and the tapped or threaded section 216 of the aperture 206) may' provide an even greater reduction in the bending stress on bolts 112 than the embodiments described with respect to FIGS. 2A, 2B, 3A, and 3B. Compound hub flange 500 may also be used in accordance with flange connections comprising fully threaded apertures. The compound hub flanges described herein may also be used with other types of mechanical couplings of similar geometric proportions to a flange. These types of couplings may include, but are not limited to, couplings using clamps or external threaded rings in substitution or addition to the threaded fasteners.

A compound huh flange 502 of compound hub flange connection 500 may comprise an inner hub face 512 and an outer hub face 514. For example, an upper compound hub flange 502a may comprise an inner hub face 512a and an outer hub face 514a. A lower compound hub flange 502b may similarly comprise an inner hub face 512b and an outer hub face 514b. The inner hub faces 512a and 512b of the hub flange 502 are located closer (along a radial direction) to a longitudinal axis 550 of the hub flange 502. When upper compound hub flange 502a is connected to lower compound hub flange 502b, inner hub faces 512a and 512b may contact one another via a radially inner hub 513 and outer hub faces 514a and 514b may contact one another via a radially outer hub 515. In this manner, a groove 520 may be formed. Groove 520 may be hexagonal in shape when viewed as a circumferential cross section, as depicted in FIGS. 5A and 5B, or groove 520 may be circular or substantially rounded or any similar shape. Groove 520 provides reduced stiffness between the inner and outer hub faces. Groove 520 is not intended to provide a sealing surface and is approximately an order of magnitude larger in volume than grooves traditionally used to house gaskets. The reduced stiffness allows for increased stability of hub face preloads when subjected to external and thermal loads by allowing for flexibility within the body of the flange. This flexibility and increased stability of the hub preloads reduces the load transferred to the highest loaded bolt by more evenly distributing the load between bolts 112. Additionally, when the flange 502 is subjected to external bending, the outer huh 515 reduces the load on the bolts 112 that are on the tension side of bending by imparting an opposing three on the compressive side of bending, thereby coupling the external moment with a compressive reaction point, on outer hub 515, that is located further from the neutral axis of bending.

Figure 6A:
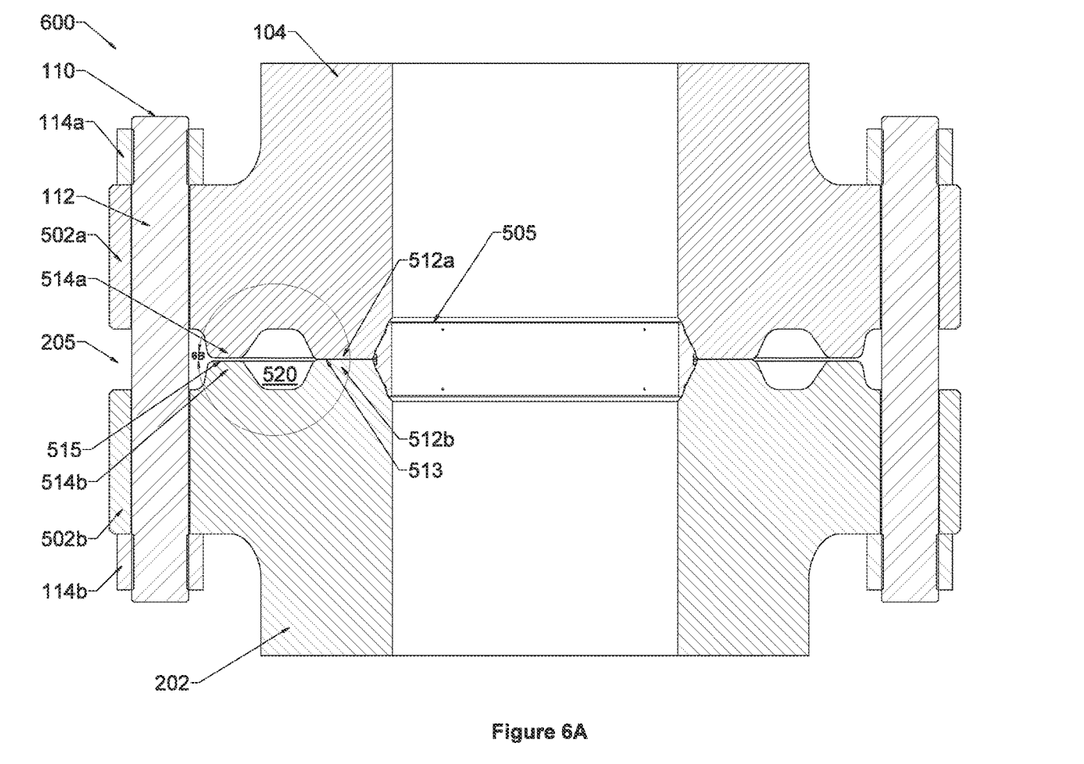
FIG. 6A is a cross-sectional view of a compound huh flange connection, in accordance with an embodiment of the present disclosure.
Figure 6B:
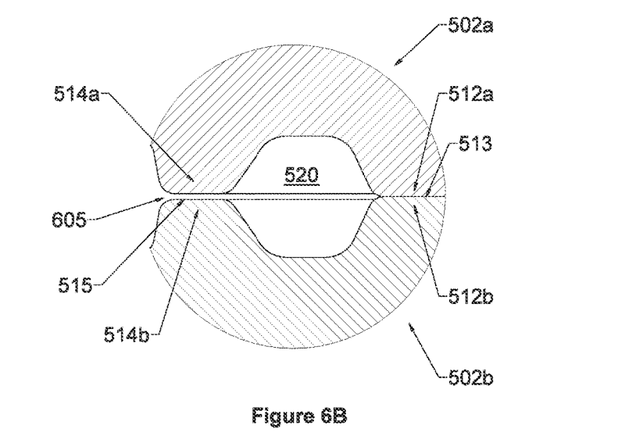
FIG. 6B is a cross-sectional view of a compound hub flange connection of FIG. 6A taken within the circle B, in accordance with an embodiment of the present disclosure.

FIGS. 6A and 6B illustrate a similar embodiment of the compound hub flange connection 500 described above, but with a small gap 605 between outer hubs 514a and 514b compound hub flanges 502a and 502b, respectively. As illustrated, such a gap may not be present between inner hubs 512a and 512b of the compound hub flanges 502b and 502b, respectively. As bolt 112 is fastened to compound flanges 502a and 502b, gap 605 closes to improve the seal integrity between inner hub 513 and gasket 505 by storing a preload in the inner hub 513. As a result, the gap 605 may be useful for mitigating separation between inner hub faces 512a and 512b. Mitigation of hub face separation is beneficial for minimizing relative sliding on interfacing surfaces between the flange 500 and the metal gasket 505. Minimizing sliding between the gasket 505 and flange 500 increases the life of the gasket 505 by reducing wear between the metallic surfaces.

Figure 6C:
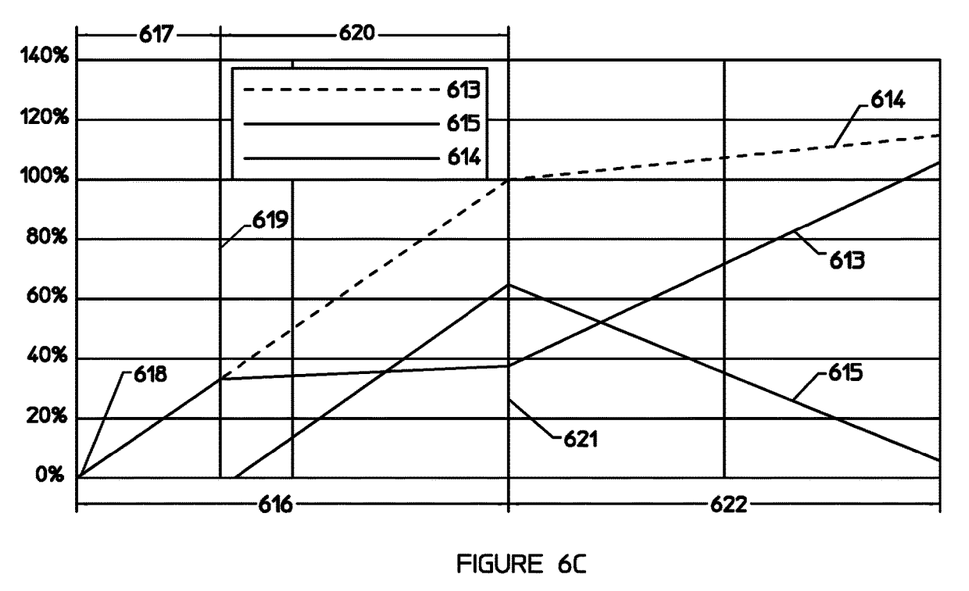
FIG. 6C is a plot illustrating preload and subsequent exposure to a thermal gradient on a compound hub flange connection of FIGS. 6A and 6B, in accordance with an embodiment of the present disclosure.

FIG. 6C depicts the contact forces for the inner hub 513 of the hub flange connection 500 of FIGS. 6A and 6B, represented by inner hub curve 613. FIG. 6C also depicts the contact forces for the outer hub 515, represented by outer hub curve 615. Inner hub curve 613 and outer hub curve 615 are shown relative to a sum of the bolt loads 614, specifically for a compound hub flange with an initial gap 605 at the external hub face as depicted in FIGS. 6A and 6B. The left half 616 of this plot shows the relationship between these forces as the flange body is joined with its mating part by increasing the bolt forces. For explanation purposes of the left half 616 of FIG. 6C, the preloading of the bolt may be represented by two phases of increasing bolt load. A first phase 617 begins at the origin 618 of the plot. In this phase, the bolt load 614 is approximately equal to the inner huh load 613. In this phase, the bolt load 614 and inner hub load 613 increase in equal magnitude until contact is first made on the outer hub, which ends the first phase 617 and starts the second phase 620. This is indicated on this plot at vertical line 619, which represents a point of first contact. The point of first contact on the outer hub begins the second phase 620 of bolt preload. In this stage, the remaining bat preload primarily reacts against the outer huh. The second phase 620 ends at vertical line 621. This represents the end of the initial mating of the flange and the end of the second phase of bolt preload. For this representative embodiment, the outer hub resists approximately 60% of the initial bolt preload and the inner hub resists approximately 40% of the initial bolt preload, as shown in FIG. 6C.

Figure 7A:
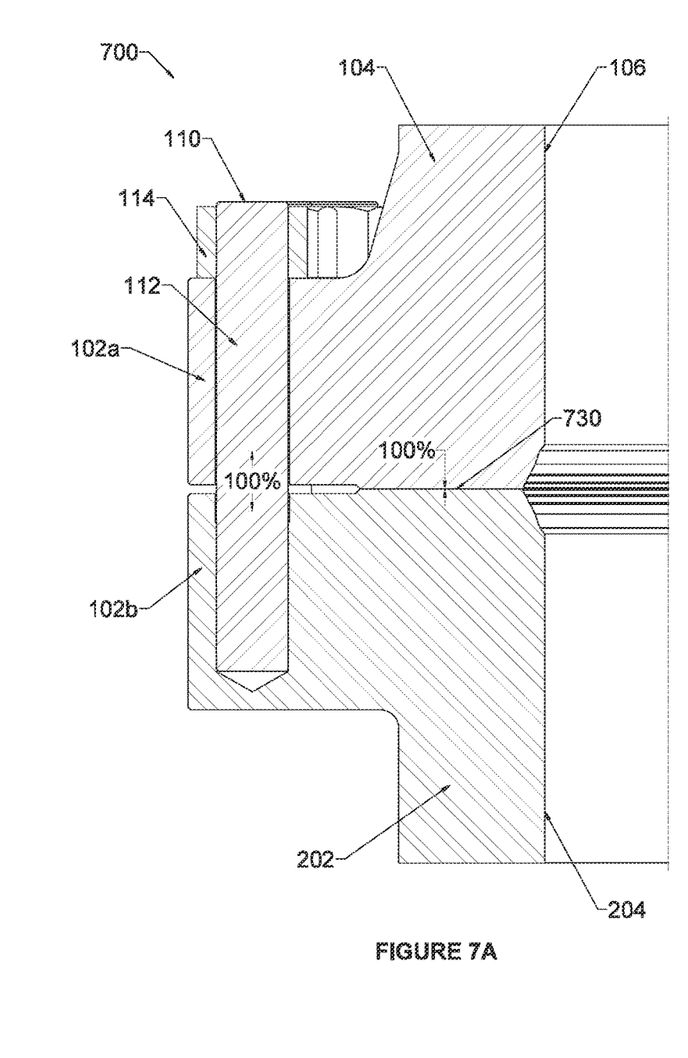
FIG. 7A is a cross-sectional view of a traditional single hub flange connection, in accordance with an embodiment of the present disclosure.
Figure 7B:
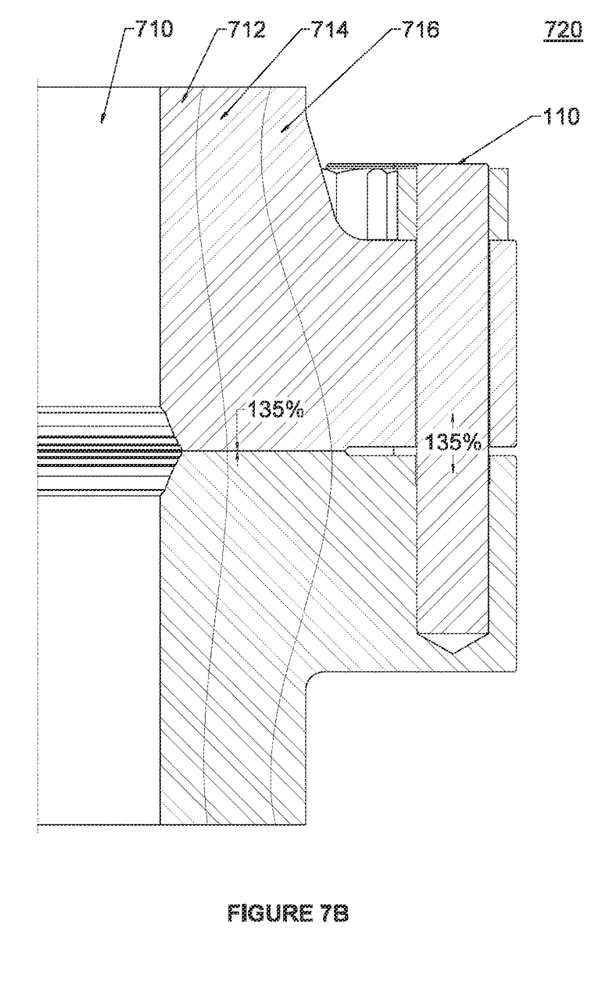
FIG. 7B is a cross-sectional view of a thermal gradient of a traditional hub flange connection, in accordance with an embodiment of the present disclosure.

The right half 622 of the plot shows how these threes change when subjected to a thermal gradient consisting of a hot bore 710 and a cold exterior 720, shown in FIGS. 7A and 7B, as is commonly experienced by flanges that are installed subsea after initial makeup. As can be seen in the right half 622 of FIG. 6C, the inner hub curve 613 increases in load, to approximately 105% of the bolt load, due to thermal expansion at the inner hub 513. The outer hub curve 615 decreases in load, to approximately 5%, due to thermal contraction at the hub 515 and the increase in load on the inner hub 513. The net increase in the load on the bolts is approximately 10%. The magnitudes of the load values represented in FIG. 6C are representative of a single embodiment of flange 600. These values may be systematically changed by variation of the overall size of the flange, the size and shape of groove 520, the magnitude of gap 605, and the outer diameter of hub 515. It should also be noted that similar thermal benefits of a compound hub flange would be experienced without the initial gap 605. This would likely yield an even lower change in the resultant bolt stress after the thermal gradient is applied, but would sacrifice some performance regarding the life of the metal gasket. Other embodiments of this design may include a series of stepped hub faces, which would yield similar benefits, but at the cost of increased manufacturing difficulty. As will be demonstrated in a subsequent figure, the increase in bolt load due to thermal expansion on a compound hub flange is far less than the increase in bolt load experience by a single hub flange of similar size.

FIGS. 7A and 7B provide cross-sectional views of a traditional hub flange connection 700, where FIG. 7A shows a traditional hub flange connection 700 under ambient conditions without effect of a thermal gradient, and FIG. 7B depicts a traditional hub flange connection 700 under high temperature conditions causing a thermal gradient, for example, at a downhole location. A traditional hub flange connection 700 may be used to connect a flange 102*a* to a flange 102*b*. Flange 102*a* and flange 102*b* may be similar to flange 102 and equipment component 200 as described with FIGS. 2A and 2B.

As used herein, the term "ambient temperature" refers to the general temperature of a flange and its surrounding environment (including other equipment) prior to installation in a subsea environment. "Ambient temperature" may mean that the flange and its surrounding environment are in a state of substantially uniform temperature distribution with a negligible temperature or thermal gradient, relative to the extreme temperature or thermal gradients possible after subsea installation. As shown in FIG. 7A, a traditional hub flange connection 700 may have 100% of the initial bolt preload on a traditional hub 730 with no thermal gradient. In a subsea environment, thermal gradients are formed due to the contrast of high temperatures within a hot bore 710, which may be a composite of bores 106 and 204, and the low temperatures of the exterior of a bore, for example, a cold exterior 720. For example, in subsea conditions, the temperature of the hot bore 710 may be 350° F., and the temperature of the cold exterior 720 may be 35" F.

As a result, a temperature gradient may be formed between the hot bore 710 and cold exterior 720. For example, zones 712, 714, and 716 representing different ranges of temperatures may be formed through the traditional hub flange connection 700. A first zone 712 may have a temperature range of 350° F. to 250° F., a second zone 714 may have a temperature range from 250° F. to 100° F., and a third zone 716 may have a temperature range from 100° F. to 35° F. The exposure of high temperatures of the thermal gradient on flange connection 700 causes thermal expansion of flanges 102*a* and 102*b*. Since hub 730 is located in these higher temperature zones, the metal expands at this interface. On the contrary, the bolts 110 are located in lower temperature zones, which results in the unstressed-state of the bolts reducing in overall length. This contradictory metal expansion between hub 730 and bolts 110 results in increased stresses in the bolts. For large diameter subsea flanges subjected to large thermal gradients, FBA has shown that the increase of stress in bolts 112 may be 35% or greater. Such an increase of tensile stress on bolt 112 is undesirable and can be mitigated without increasing the thickness of the flange 102 using the compound huh flange connection 500 of FIGS. 5A, 5B, 6A, and 6B described below.

Figure 7C:
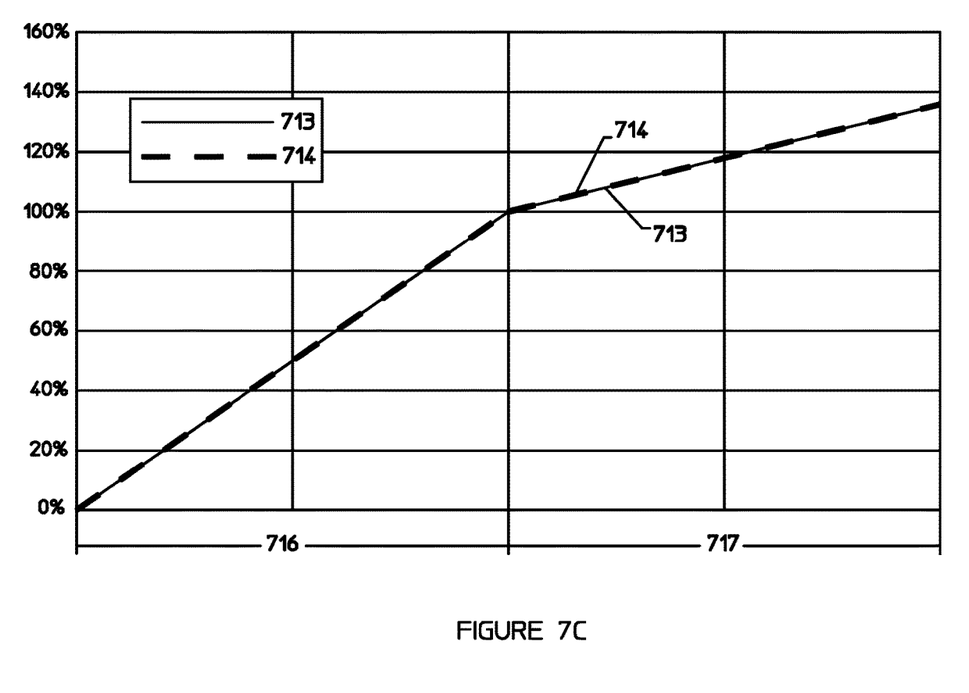
FIG. 7C is a plot illustrating preload and subsequent exposure to a thermal gradient on a traditional single hub flange connection of FIGS. 7A and 7B, in accordance with an embodiment of the present disclosure.

FIG. 7C depicts the contact forces for a single hub curve 713 relative to the sum of the bolt loads 714, specifically for a traditional hub flange of similar size to the compound hub flange represented in FIG. 6C. The left half 716 of this plot shows the relationship between these forces as the flange body is joined with its mating part by increasing the bolt forces (preloading). For explanation purposes of figure FIG. 7C, more specifically the left half 716, the preloading of the bolt only needs to be represented in a single phase since there is not an outer hub with an initial gap. For the typical single hub flange the sum of forces in the bolts are equivalent in magnitude to the forces in the single huh 730 at the end of flange make-up. The right hall 717 shows how these forces change when subjected to a thermal gradient consisting of a hot bore 710 and a cold exterior 720, as is commonly experienced by flanges that are installed subsea after initial makeup. As can be seen in the right half 717 of FIG. 7C, both the hub load 713 and bolt load 714 increase by approximately 35%, from 100% to 135%. This is a result of thermal gradient and thermal expansion/contraction causing the unstressed-state of the hub 730 to expand and unstressed-state of the bolts 112 to contract. Additionally, due to additional stiffness resulting from the lack of groove 520, this effect is further amplified, resulting in bolt stresses that are near the limit of industry regulations on the allowable stress levels for bolting. This phenomenon, as proven by detailed FBA, leaves traditional single hub flanges with little remaining stress capacity in the bolts for carrying the external loads subjected to subsea flanges. An alternative option to combat the negative thermal effects subjected to bolting in subsea flanges is to reduce the initial bolt preload, but this is unfavorable due to the inverse relationship between bolt preload and fatigue life.

For purposes of this disclosure, thermal expansion and thermal contraction refers to the general physics and engineering, definition of this phenomenon. This phenomenon may be thought of as the property of a metal (and most other materials shrink or expand in an unloaded or unstressed state when subjected to a change in temperature. For clarification purposes, thermal expansion and/or thermal contraction as used herein is referring to this properly and related phenomena, and not necessarily the explicit expansion or contraction of material. For example, fasteners on flanges subjected to the temperature gradients described herein (i.e., higher internal bore temperatures relative to the adjacent exterior temperatures) are explained to thermally contract due to the reduction in temperature. Although the effect of the lower local temperature at a fastener experiencing thermal contraction is to reduce the length and/or volume of the fastener, external forces and/or displacements or deformations of surrounding material (including the effects of thermal expansion and/or thermal contraction outside of the fasters) may result in the overall lengthening or expansion of the fastener.

Figure 8A:
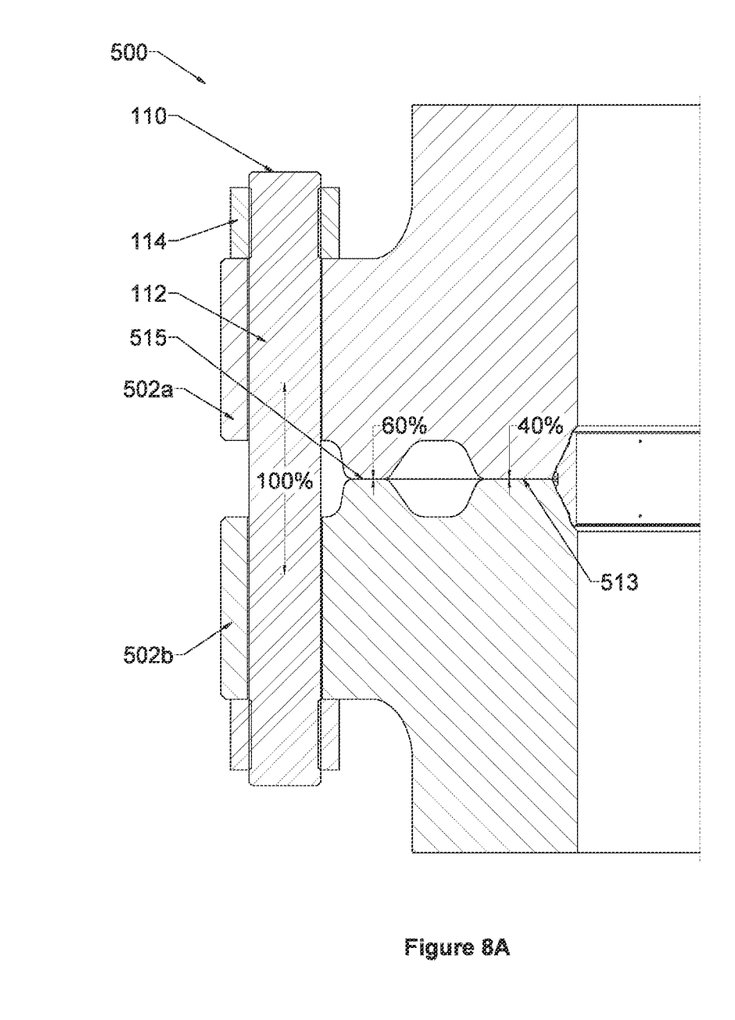
FIG. 8A is a cross-sectional view of a compound hub flange connection, in accordance with an embodiment of the present disclosure.
Figure 8B:
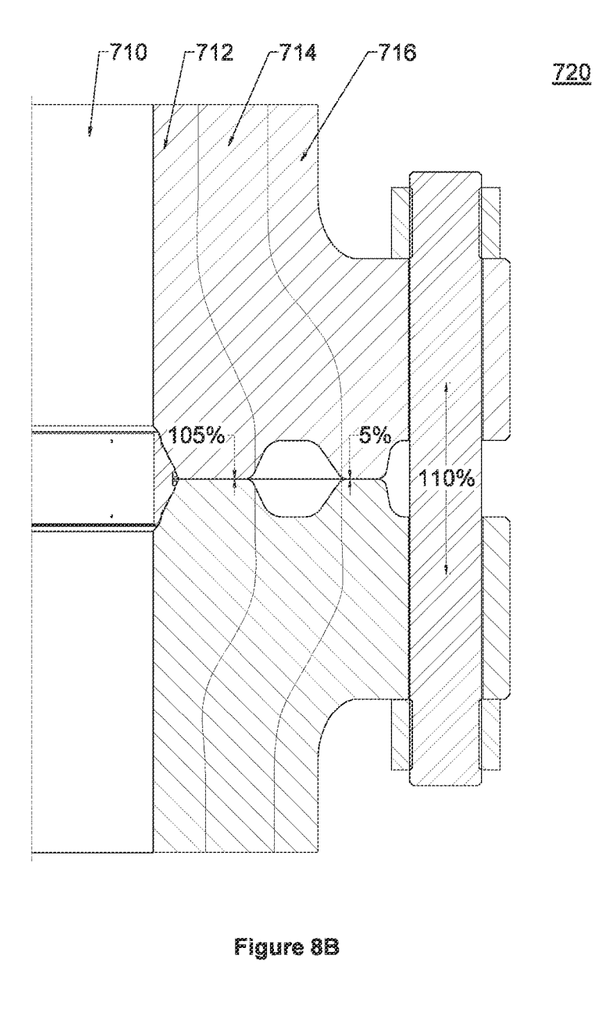
FIG. 8B is a cross-sectional view of a thermal gradient of a compound hub flange connection, in accordance with an embodiment of the present disclosure.

FIGS. 8A and 8B provide cross-sectional views of a compound hub flange connection 500, where FIG. 8A shows a compound hub flange 500 under ambient conditions without the effect of a thermal gradient, and FIG. 8B depicts a compound huh flange 500 under high temperature conditions causing a thermal gradient, for example, at a subsea location. As shown in FIG. 8A, a compound hub flange connection 500 may have a higher percentage preload on outer hub 515 and a lower percentage preload on inner hub 513. For example, at ambient temperatures, outer hub 515 may have a 70% preload and inner hub 513 may have a 30% preload.

Referring now to FIG. 8B, as discussed above with respect to FIG. 7B, large temperature differences between a hot bore 710 and cold exterior 720 may result in thermal gradients 712, 714, and 716. High temperatures from these thermal gradients May cause compound hub flanges 502*a* and 502*b* to expand, and thus produce increased bending stress on bolts 112. However, the configuration of compound hub flange connection 500 results in less of an increase in bending stress of the bolt three. Taking the example above, where the inner hub 513 had a 40% preload and the outer hub 515 had a 60% preload under ambient conditions, FIG. 8B (and FIG. 6C) shows the resulting changes in hub and bolt loads when the compound hub flanges 502*a* and 502*b* are subjected to thermal expansion at inner hub 513 and thermal contraction at outer hub 515.

Inner hub 513 is subjected to the highest temperature zone 712 of the thermal gradient, and thus experiences an increase in hub force from 40% to 105%, compared to the original preloaded condition. As a result of the thermal expansion of inner hub 513 and thermal contraction of outer hub 515, the preload on outer hub 515 decreases from 60% to 5%, compared to the original preloaded condition. The net effect of this is a net increase of 10% load on bolt 112, compared to the 35% increase on bolt 112 in a traditional huh flange shown in FIG. 7B. Thus, compound hub flanges reduce the load of bolts 112 compared to traditional hub flanges when subjected to high thermal gradients typical for subsea flanges. These high thermal gradients typical for subsea flanges are typical because of the difference in temperature between the cold water surrounding (radially external to) the subsea flange and hot production fluid transported internally through (radially internal to) a flowbore of the subsea flange. This reduction in bolt stresses induced by the thermal gradient allows for additional external loading capability before the allowable stress limit of the bolt is reached.

Figure 9A:
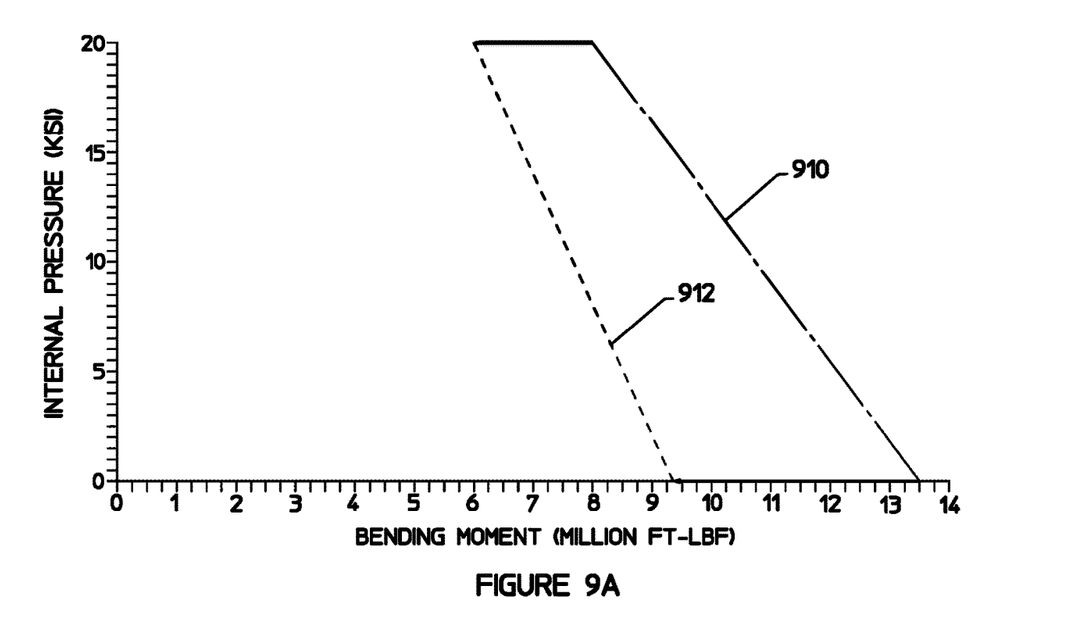
FIG. 9A is a plot illustrating a pressure versus bending load capacity chart on a compound hub flange connection, in accordance with an embodiment of the present disclosure.
Figure 9B:
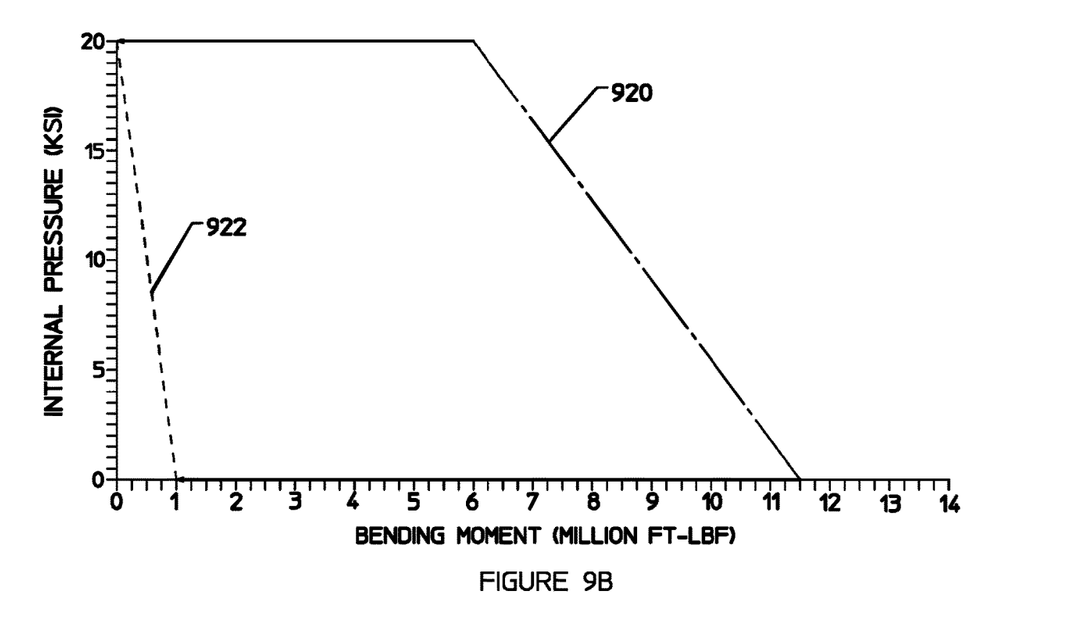
FIG. 9B is a plot illustrating a pressure versus bending load capacity chart on a traditional hub flange connection, in accordance with an embodiment of the present disclosure.

FIGS. 9A and 9B are plots comparing the combined loading capabilities in a traditional hub flange connection versus a compound bub flange connection. These charts are often provided by manufacturers to end-users so that they may assess the whether a flange, or other mechanical joint, is sufficiently strong to meet the intended load combination. The load combinations that are typically shown on these charts include combinations of internal pressure versus external bending moment. For subsea flanges, the strength of the flange joint is typically limited by the stress in the bolts. Lines 910 and 912 in FIG. 9A represent the limits of the combined loads that may be applied to the compound hub flange before exceeding the rated capability of the flange. For example, all combinations of bending and internal pressure that fall to the left of line 910 are within the rated capability of the compound hub flange without thermal gradient. Any combination of external bending and internal pressure that falls to the right of line 910 is undesirable, as it exceeds the rated capability of the flange. Similarly, external load combinations that fall to the left of line 912 are within the rated capability of the compound hub flange when additionally subjected to a high temperature gradient. The two horizontal leftward pointing arrows indicates the change in the rated capability of the compound hub flange when subjected to a thermal gradient. Similarly, line 920 and 922 in FIG. 9B show the rated capabilities of the traditional single hub flange for both the "without thermal gradient" and "with thermal gradient" conditions, respectively.

By comparing FIG. 9A to FIG. 9B, it can be realized that the thermal gradient reduces the rated capabilities of both flanges, but the percent and magnitude of reduction of rated capability is significantly lower with the compound hub flange versus the single hub flange. This a result of thermally contracting external hub 515 counteracting the thermally expanding inner hub 513 as previously described. It can also be realized that the compound hub flange has greater rated capability in all relative scenarios. This is a result of the increased flange body flexibility, from groove 520, more evenly distributing the load across all bolts and external bending moment reaction point on external hub lace 514. Thus, the compound hub flange 500 provides a rated capability under ambient conditions, and also provides, less of a decrease in the rated capability under high temperature conditions as compared to the traditional hub flange.

Accordingly, the present disclosure provides a flange connection that reduces stresses on the bolts used to form the connection while minimizing an overall size and weight of the flange connection. This is particularly useful in the field of subsea equipment, where components with very large diameters are routinely connected and it is important to keep the stack height and weight of this subsea equipment as low as possible.

Although the present disclosure and its advantages have been described in detail, it should be understood that various changes, substitutions and alterations can be made herein without departing from the spirit and scope of the disclosure as defined by the following claims.

What is claimed is:

1. A system, comprising:
    an upper compound hub flange comprising an aperture, an inner hub face, and an outer hub face, wherein the outer hub face is arranged radially outward with respect to the inner hub face;
    a lower compound hub flange adjacent the upper compound hub flange and having an aperture extending therethrough, wherein the aperture is aligned with the aperture of the upper compound hub flange, wherein the lower compound hub flange further comprises an inner hub face and an outer hub face, wherein the inner hub face and the outer hub face of the lower compound hub flange are disposed adjacent to the inner hub face and the outer hub face of the upper compound hub flange, and wherein each of the apertures is arranged radially outward with respect to each of the outer hub faces; and
    a bolt extending through the apertures of the upper compound hub flange and the lower compound hub flange to couple the upper compound hub flange to the lower compound hub flange;
    wherein a circumferential groove is formed between the inner hub faces of the upper and lower compound hub flanges and the outer hub faces of the upper and lower compound hub flanges when the bolt couples the upper compound hub flange to the lower compound hub flange, wherein the circumferential groove does not provide a sealing surface; and
    wherein there is a gap between the outer face of the upper compound hub flange and the outer face of the lower compound hub flange.

2. The system of claim 1, wherein the circumferential groove is hexagonal in shape when viewed from a circumferential direction.

3. The system of claim 1, wherein the circumferential groove provides increased flexibility between the inner and outer hub faces of each of the upper and lower compound hub flanges to improve flange performance when the system is subjected to a thermal gradient.

4. The system of claim 1, wherein there is a gap between the aperture of the upper compound hub flange and the aperture of the lower compound hub flange, wherein the bolt extends through the gap.

5. The system of claim 1, wherein a nut is threaded on each end of the bolt to secure the upper compound hub flange and the lower compound hub flange in compression.

6. The system of claim 1, wherein a gasket is disposed between the upper compound hub flange and the lower compound hub flange.

7. A system comprising;
    a compound hub flange comprising an aperture extending therethrough, an inner hub, and an outer hub, wherein a groove is formed between the inner hub and the outer hub, wherein the groove does not provide a sealing surface;

a piece of equipment adjacent the compound hub flange and having an aperture extending therethrough and aligned with the aperture of the compound hub flange, wherein the piece of equipment has a continuous face facing the compound hub flange and contacting both the inner hub and the outer hub of the compound hub flange; and a bolt extending through the compound hub flange and threaded into the piece of equipment to connect the compound hub flange to the piece of equipment.

8. The system of claim 7, wherein a first axial portion of the aperture through the piece of equipment is unthreaded, and wherein a second axial portion of the aperture through the piece of equipment is threaded.

9. The system of claim 8, wherein the first axial portion has a length of about 3 inches.

10. The system of claim 8, wherein the first axial portion has a length of about 1.5 inches.

11. The system of claim 7, wherein the aperture of the piece of equipment is fully threaded.

12. The system of claim 7, wherein the groove provides increased flexibility between the inner hub and outer hub of the compound hub flange to improve flange performance when the system is subjected to a thermal gradient.

13. The system of claim 7, wherein there is a gap between the aperture of the compound hub flange and the aperture of the piece of equipment, wherein the bolt extends through the gap.

* * * * *